US010977500B2

(12) United States Patent
Zhao et al.

(10) Patent No.: US 10,977,500 B2
(45) Date of Patent: Apr. 13, 2021

(54) STREET MARKING COLOR RECOGNITION

(71) Applicant: Aptiv Technologies Limited, St. Michael (BB)

(72) Inventors: Kun Zhao, Duisburg (DE); Yu Su, Wuppertal (DE)

(73) Assignee: Aptiv Technologies Limited, St. Michael (BB)

(*) Notice: Subject to any disclaimer, the term of this patent is extended or adjusted under 35 U.S.C. 154(b) by 52 days.

(21) Appl. No.: 16/369,914

(22) Filed: Mar. 29, 2019

(65) Prior Publication Data

US 2019/0318175 A1 Oct. 17, 2019

(30) Foreign Application Priority Data

Apr. 16, 2018 (EP) ..................... 18167546

(51) Int. Cl.
*G06K 9/00* (2006.01)
*G06T 7/90* (2017.01)
*B60R 11/04* (2006.01)

(52) U.S. Cl.
CPC .......... *G06K 9/00798* (2013.01); *B60R 11/04* (2013.01); *G06T 7/90* (2017.01); *B60R 2300/804* (2013.01); *B60R 2300/8053* (2013.01); *G06T 2207/30256* (2013.01)

(58) Field of Classification Search
CPC ............... G06K 9/00798; G06T 7/90; G06T 2207/30256; G06T 2207/10024; B60R 11/04; B60R 2300/804; B60R 2300/8053; G01J 3/463; H04N 9/04
See application file for complete search history.

(56) References Cited

U.S. PATENT DOCUMENTS

| | | | |
|---|---|---|---|
| 2015/0215550 A1 | 7/2015 | Frenzel et al. | |
| 2017/0246473 A1* | 8/2017 | Marinkovich | G16H 40/20 |
| 2018/0373941 A1* | 12/2018 | Kwant | G08G 1/0129 |

FOREIGN PATENT DOCUMENTS

| | | | |
|---|---|---|---|
| CN | 103426893 | | 12/2013 |
| CN | 205211754 | | 5/2016 |
| CN | 106874875 | * | 2/2017 |
| CN | 107590470 | * | 9/2017 |
| DE | 10 2008 031 861 A1 | | 1/2010 |
| JP | 2000 029516 A | | 1/2000 |
| JP | 2002 123819 A | | 4/2002 |

OTHER PUBLICATIONS

Machine translation for CN 106874875 (Year: 2017).*
Machine translation for CN 107590470 (Year: 2017).*

(Continued)

*Primary Examiner* — Qian Yang
(74) *Attorney, Agent, or Firm* — Colby Nipper PLLC

(57) ABSTRACT

The present invention relates to a method and an image processing system for determining the color of a street marking, by: capturing an image of a street, detecting a street marking as a set of pixels provided by the image, wherein the pixels include at least two different pieces of color information, determining a color score for the street marking by comparing said at least two different pieces of color information, and determining the color of the street marking by comparing the color score to at least one threshold value.

20 Claims, 3 Drawing Sheets

(56) References Cited

OTHER PUBLICATIONS

Huang et al., "Nighttime Vehicle Detection and Tracking Base on Spatiotemporal Analysis using RCCC Sensor", 2017 IEEE 9th International Conference on Humanoid, Nanotechnology, Information Technology, Communication and Control, Environment and Management (HNICEM) (Year: 2017).*

Duda R O et al: "Pattern Classification, Introduction", Jan. 1, 2001, pp. 1-19.

Duda R O et al: "Pattern Classifiaction, Bayesian Decision Theory", Jan. 1, 2001, pp. 20-83.

"Foreign Office Action", CN Application No. 201910298981.5, dated Dec. 17, 2020, 21 pages.

* cited by examiner

STREET MARKING COLOR RECOGNITION

TECHNICAL FIELD OF INVENTION

This disclosure generally relates to a method to, and an image processing system for, determining the color of a street marking.

BACKGROUND OF INVENTION

Applications are known in the prior art that permit detecting and tracking street markings, such as for example lane markings, on the road. The challenges faced by such applications can depend on the different lighting conditions, raining, poor lane markings, and the problem of distinguishing street markings from objects on the road.

Color extraction can significantly enhance the functionality of street marking detection, allowing to distinguish between different street markings based on their colors. In this respect, road marking regulations may prescribe that street markings should be treated differently based on their colors. For example, according to European traffic rules, when yellow and white color lane markings are detected, the yellow lane marking should be treated with higher priority to override directions provided by the white lane marking. Such yellow lane markings are often used to improve road safety near construction zones.

For a conventional red-green-blue RGB camera, which separately records red, green and blue color information for image pixels, the different color channels measure the different color intensities corresponding to the visual spectrum, and thus allow a straightforward color classification, e.g. based on a three-color information chart.

However, as image conditions can affect the correctness of the detected color, the color may require adjustment to render specific colors correctly. For this purpose, color balance methods, e.g. gray balance, neutral balance, or white balance methods, can be used. For example, the goal of the white balance is to render the color in the image correctly, in particular to compensate color shift effects caused by changes in illumination characteristics.

For example, at dusk, the low sun illumination has a low temperature, which renders everything with a reddish color. Human eyes are quite good at white balance, but one still has the experience that an image taken under incandescent lamp shows significant color shift, wherein a white object often seems yellowish.

Also for camera sensors, it can be challenging to correct the color shift. This problem is particularly relevant for a lane detection system attempting to correctly detect and distinguish white and yellow lane markings based on their colors, in particular when faced with changing lighting conditions.

The problem is even more challenging when a red-clear camera is used instead of the conventional RGB camera, which is often the case in automobile applications. In images captured by red-clear cameras, the pixels provide only red color information and clear color information, wherein the clear color information provides no red, green or blue color information.

For example, in a four pixel arrangement of a red-clear camera, one pixel can capture the red light information, whereas the remaining three pixels have no R/G/B filters provided on top of them. In other words, images captured by red-clear cameras do not provide full R/G/B color information. It follows that the above described color balance problem cannot be compensated by traditional color balance methods, since the image captured by the red-clear camera provides no green and blue color information.

SUMMARY OF THE INVENTION

Described herein are techniques to provide an improved street marking color determination, in particular to distinguish street lanes having different colors, for example to provide street marking color determination with improved lighting condition compensation.

In accordance with a first aspect of the invention, a method for determining the color of a street marking comprises: capturing an image of a street, detecting a street marking as a set of pixels provided by the image, wherein the pixels include at least two different pieces of color information, determining a color score for the street marking by comparing said at least two different pieces of color information, and determining the color of the street marking by comparing the color score to at least one threshold value.

The method advantageously determines the color of a street marking by comparing a color score to at least one threshold value. The color score represents a value that is determined by comparing at least two different color information provided by a set of pixels, wherein the set of pixels corresponds to the street marking.

For example, the image can contain a set of pixels captured by an RGB camera, i.e. a camera for capturing images having pixels with red, green and blue color information. Here, the color yellow, for example, corresponds to a combination of the red and green color information. Hence, for a RGB camera, the proportions of the red, green and blue channel information, at each set of pixels, can be analyzed by comparison to determine the color of the street marking. This has the advantage that if, for example, the lighting conditions change such as to affect the red, green and blue channel information in a similar manner, for example due to lighting and brightness changes affecting all colors, the proportions of the channel information may remain relatively unaffected. As a result, the color detection is less sensitive to changes in image conditioning.

Similarly, when using a red-clear type camera, the camera captures images having pixels with red color information and clear color information. As mentioned above, the clear color information corresponds to pixels having no red, green or blue color distinction.

Without the green and blue channel information, it is not possible to distinguish all visible spectrum colors. For example, it is not possible to distinguish the color yellow from pure red, or, e.g. magenta, which is a combination of red and blue.

However, if only a limited number of colors need to be detected, the two pieces of color information provided by the red-clear type camera can be sufficient to distinguish between the colors. For example, when determining the color of a street marking, in particular the color of a road edge marking or lane marking, traffic rules may prescribe that only white and yellow colors should be used. In this case, the red-channel information can be compared to the clear color information, and when a certain proportion of the color information is met, the color can be detected, for example as yellow.

More specifically, according to the present invention, the color of a street marking is determined by comparing at least two pieces of color information provided by a set of pixels, such as to determine a color score. The color score can represent a value indicating the detected color, for example, indicating the above proportion of color information to describe the yellowness of the street marking.

The color score can be determined by calculating proportions or other dependencies, based on a comparison of the different pieces of color information provided by the set of pixels, for example by using a training-based classifier, such as for example a neural network or a Fuzzy logic based classifier. In an example, the classifier can be trained by using a machine learning based training data set, for example with labeled white and yellow lane markings, such as to train the classifier to calculate a color score based on the pieces of color information provided by the set of pixels.

In order to determine the color of the street marking, the color score is compared to at least one threshold value. For example, the color score can be compared to one threshold value such as to decide between two different colors, two threshold values such as to decide between three different colors, or n threshold values such as to decide between n+1 different colors. Hence, if there are only two possible colors, for example white and yellow colors of a street lane marking, the color score only needs to be compared with a single threshold value, to separate the two colors.

As mentioned above, although image conditions can affect the intensities of each of the different pieces of color information provided by the set of pixels, the color score is determined based on a comparison of the different pieces of color information, and thus may compensate illumination affects that affect the different colors in the same or similar way.

Preferably, the at least one threshold value is determined to further enhance this advantageous property. This is particular useful when changing illumination conditions, for example during urban/suburban night driving, make it difficult to correctly distinguish the different colors. As mentioned above, low sun light at dusk may shift colors to reddish in a camera image, which may cause a white color lane marking to be incorrectly recognized as yellow, in particular when using a red-clear camera. In another example, the color shift may depend on the type of street lights or the vehicle's own front light spectral and intensity characteristics.

In view of this problem, the color scores determined for a plurality of street markings are preferably gathered, such as to determine the at least one threshold value based on the statistical distribution of the gathered color scores. For example, the color scores can be gathered based on a plurality of street markings detected in a plurality of images, for example in a plurality of image frames of a video stream, in particular during capturing of the video stream taken from a vehicle.

By gathering the color scores determined from the street markings in each camera frame, in particular the color scores determined from lane markings in a plurality of image frames of a video stream, the statistical distribution of the determined color score can be analyzed and estimated. For example, if in multiple frames, there is only one color (e.g. either white or yellow) of captured lane markings, the statistical distribution of the determined color score can be efficiently modelled for classification purposes, for example as a single Gaussian statistical distribution.

Thus, by analyzing the color score distribution cross multiple frames, the relative difference between different colors, for example yellow and white colors, can be described in statistical terms. This allows an efficient threshold value to be determined for improving classification of the color of street markings based on the different color score statistical distributions, for example based on probability calculations derived from the different color score statistical distributions. Preferably, the color scores can be gathered from frames of a video stream, and the corresponding threshold value determined based on the gathered color scores, during capturing of the video stream taken from a vehicle. In this way, the threshold value can be adapted to changes in image conditions during driving.

In other words, preferably, the threshold value is determined based on the statistical distribution of the color score being modelled as a superposition of a plurality of statistical color distributions, wherein each of the statistical color distributions corresponds to a color of a street marking, further preferred, wherein the statistical distribution is modelled as a superposition of a plurality of Gaussian statistical color distributions.

For example, if there are only two different colors involved, for example yellow and white colored lanes, then the color scores can be modelled as a superposition of two distinguishable Gaussian statistical distributions.

In an example of the present invention, the color of the street marking is determined to correspond to a first color if the color score is greater than a threshold value, and the color of the street marking is determined to correspond to a second color if the color score is smaller than the threshold value. Preferably, the first and second colors correspond to the colors of a street lane, further preferred wherein the first and second colors correspond to the colors yellow and white, or white and yellow, respectively.

The proposed method according to the present invention is different from the conventional color balance used for RGB cameras, wherein certain color channels are being amplified, either as analog signals on a camera sensor, or as digital signals in digital post-processing algorithms, to correctly render the color. According to the present invention, a threshold value is used to correctly distinguish between the different colors based on a comparison with a color score. Hence, the color score is derived by comparison of different pieces color information, and thus can, in combination with the comparison with the threshold value, enhance the robustness and efficiency of the color detection, in particular wherein changing image conditions can affect the intensities of each of the different pieces of color information provided by the respective set of pixels.

In accordance with a second aspect of the present invention, an image processing system is provided, comprising: a camera adapted to capture an image of a street, an image processing means coupled to the camera, wherein the image processing means is adapted to: detect a street marking as a set of pixels provided by the image, wherein the pixels include at least two different pieces of color information, determine a color score for the street marking by comparing said at least two different pieces of color information, and determine the color of the street marking by comparing the color score to at least one threshold value.

The image processing system advantageously determines the color of a street marking by comparing a color score to at least one threshold value. The color score represents a value that is determined by comparing at least two different pieces of color information provided by a set of pixels, wherein the set of pixels corresponds to the street marking.

For this purpose, the image processing system comprises a camera, and an image processing means coupled to the camera. The image processing means can include computing means, such as for example a microprocessor coupled to storage means, wherein the storage means includes software adapted to be executed by the microprocessor, such as to have the image processing means: detect a street marking as a set of pixels provided by the image, wherein the pixels include at least two different pieces of color information, determine a color score for the street marking by comparing said at least two different pieces of color information, and determine the color of the street marking by comparing the color score to at least one threshold value, in accordance with the present invention.

Preferably, the camera is an RGB camera, i.e. a camera for capturing images having pixels with red, green and blue color information, or a red-clear type camera wherein the camera captures images having pixels with red color information and clear color information. As mentioned above, the clear color information corresponds to pixels having no red, green or blue color distinction.

Without the green and blue channel information, it is not possible for the red-clear type camera to distinguish all visible spectrum colors. For example, it is not possible to distinguish the color yellow from pure red, or, e.g. magenta, which is a combination of red and blue.

However, if only a limited number of colors need to be detected, the two pieces of color information provided by the red-clear type camera can be sufficient to distinguish between the colors.

More specifically, according to the present invention, the color of a street marking is determined by having the image processing means compare at least two pieces of color information provided by a set of pixels, such as to determine a color score. The color score can represent a value indicating the detected color, for example, indicating a proportion of color information to describe the yellowness of the street marking.

As mentioned above, the color score can be determined by calculating proportions or other dependencies, based on a comparison of the different pieces of color information provided by the set of pixels, for example by using a training-based classifier, such as for example a neural network or a Fuzzy logic based classifier. In an example, the classifier can be trained by using a machine learning based training data set, for example with labeled white and yellow lane markings, such as to train the classifier to calculate a color score based on the different pieces of color information provided by the set of pixels.

According to the present invention, the image processing means is adapted to determine the color of the street marking by comparing the color score to at least one threshold value. For example, the color score can be compared to one threshold value such as to decide between two different colors, two threshold values such as to decide between three different colors, or n threshold values such as to decide between n+1 different colors.

As detailed above, although image conditions can affect the intensities of each of the different pieces of color information provided by the set of pixels, the color score is determined based on a comparison of the different pieces of color information, and thus may compensate illumination affects that affect the different colors in the same or similar way.

Preferably, the image processing means is adapted to gather the color scores determined for a plurality of street markings, and to determine the at least one threshold value based on the statistical distribution of the gathered color scores. For example the image processing means can be adapted to gather the color scores based on a plurality of street markings detected in a plurality of images captured by the camera, preferably as detected in a plurality of image frames of a video stream captured by the camera.

In this way, color scores determined for a plurality of street markings are gathered to determine the at least one threshold value based on the statistical distribution of the gathered color scores. Thus, the statistical distribution of the determined color score can be analyzed and used for determining the at least one threshold value. For example, if in multiple frames, there is only one color (e.g. either white or yellow) of captured lane markings, the statistical distribution of the determined color score can be efficiently modelled for classification purposes, for example as a single Gaussian statistical distribution.

Preferably, the color scores can be gathered from frames of a video stream, and the corresponding threshold value determined based on the gathered color scores, during capturing of the video stream taken from a vehicle. In this way, the threshold value can be adapted to changes in image conditions during driving.

By analyzing the color score distribution for multiple frames, the relative difference between different colors, for example yellow and white colors, can be described in statistical terms. This allows an efficient threshold value to be determined for improving classification of the color of street markings based on the different color score statistical distributions, for example based on probability calculations derived from the different color score statistical distributions.

Preferably, the image processing means is adapted to determine the at least one threshold value based on modelling the statistical distribution of the color score as a superposition of a plurality of statistical color distributions. Here, each of the statistical color distributions corresponds to a color of a street marking, further preferred wherein the statistical distribution is modelled as a superposition of a plurality of Gaussian statistical color distributions.

For example, if there are only two different colors involved, e.g. yellow and white colored lanes, then the color scores can be modelled as a superposition of two distinguishable Gaussian statistical distributions, allowing a computationally efficient approach to determine a threshold value based on probabilistic considerations, for example by maximum likelihood considerations.

Preferably, the image processing means is adapted to determine that the color of the street marking corresponds to a first color if the color score is greater than a threshold value, and to determine that the color of the street marking corresponds to a second color if the color score is smaller than the threshold value, preferably wherein the first and second colors correspond to the colors yellow and white, or white and yellow, respectively.

In an example, the camera of the image processing system according to the present invention is configured to be mounted on a vehicle, preferably on a front part, rear part or side part of a vehicle. In this way, the camera is suitably positioned to capture images of street markings without obstacles blocking the view. This can be particularly useful when capturing a sequence of image frames in a video stream for gathering color scores for a street lane.

Preferably, the color of a street marking is the color of a street lane marking, further preferred a yellow color or a white color.

Accordingly, the image processing system according to the present invention uses at least one threshold value to correctly distinguish between the different colors based on a comparison with a color score. The color score is derived by comparison of different pieces of color information, and thus can, in combination with the comparison with the at least one threshold value, enhance the robustness and efficiency of the color detection, in particular when changing image conditions affect the intensities of each of the different pieces of color information in the same or similar manner.

BRIEF DESCRIPTION OF DRAWINGS

Further embodiments of the invention are described in the following description of the Figures. The invention will be explained in the following by means of embodiments and with reference to the drawings in which is shown.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
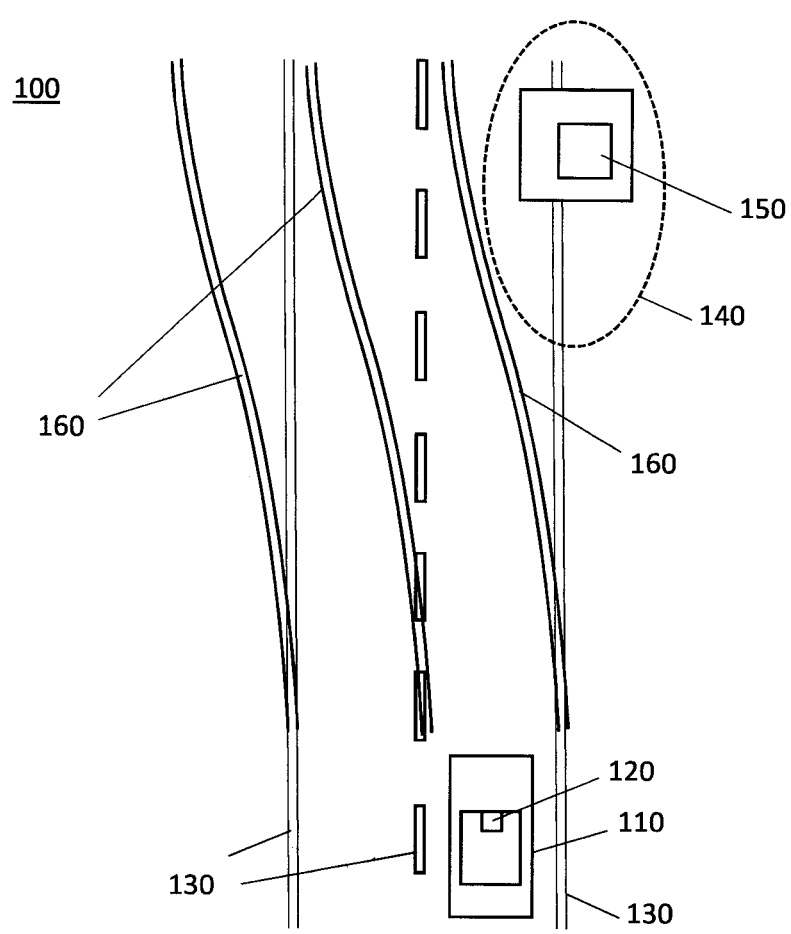
FIG. 1 is a street marking scenario.

FIG. 1 shows a street marking scenario 100, wherein a vehicle 110 having a camera 120 is travelling along a road with white street markings 130. The camera 120 is mounted behind the rear-view mirror of the vehicle 110, such as to be provided with an unobstructed front view. The camera could also be mounted on a front part, rear part or side part of the vehicle 110, for example to provide a different viewpoint on the street markings.

The white street markings 130 are arranged to define the road edges and to separate two road lanes. Thus, the white street markings 130 provide lane markings. The white street markings can also indicate road exits, road crossings or parking zones, depending on the road scenario under consideration.

In FIG. 1, a road construction zone 140 with a construction machine 150 is shown to overlap one of the white street marking 130, and to extend inside the street lane being used by the vehicle 110.

Such as to improve safety in the road construction zone 140, yellow street markings 160 have been provided to override the white street markings 130. Thus, the yellow street markings are arranged to guide the vehicle 110 to pass the construction zone 140 at a safe distance. For example, according to European traffic rules, when yellow and white color lane markings are being used, the yellow lane 160 marking should be treated with higher priority to override directions provided by the white lane marking.

It follows that a correct color extraction is required to distinguishing between the different street markings based on their colors, for example to enhance safety where yellow street markings 160 have been provided to override white street markings 130, for example at construction zones 140.

Figure 2:
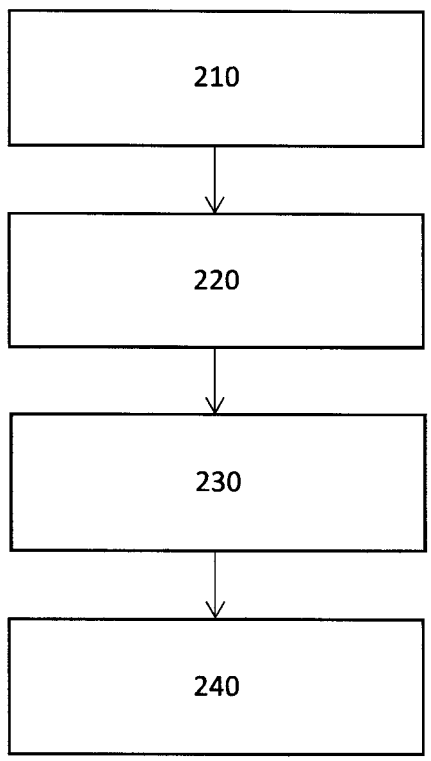
FIG. 2 is a method for determining the color of a street marking.

FIG. 2 shows a corresponding method for determining the color of a street marking 200. An image of the street is captured 210, and a street marking 130, 160 is detected as a set of pixels provided by the image 220, wherein the pixels include at least two different pieces of color information.

For example, the set of pixels provided by the image can be provided by an RGB camera 120, i.e. a camera for capturing images having pixels with red, green and blue color information. Alternatively, the set of pixels provided by the image can be provided by a red-clear type camera 120, i.e. a camera for capturing images having pixels with red color information and clear color information.

Figure 3:
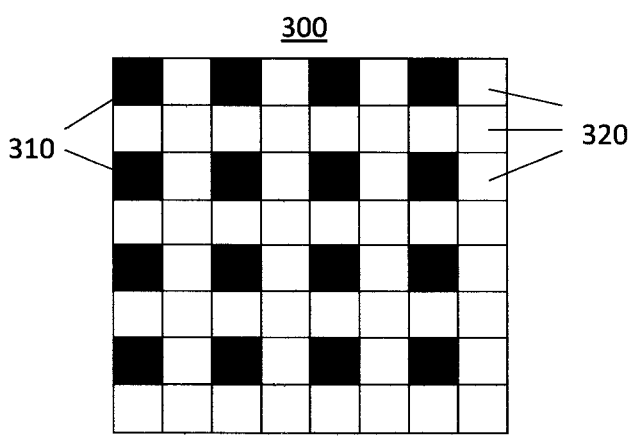
FIG. 3 is a red-clear type camera pixel arrangement.

For example, FIG. 3 shows a pixel arrangement of a red-clear camera, with pixels 310 which are adapted to capture red light information, whereas the remaining pixels 320 have no R/G/B filters provided on top of them. In other words, images captured by red-clear cameras do not provide full R/G/B color information.

In step 230 shown in FIG. 2, the at least two different pieces of color information are compared to determine a color score for the street marking. The color score can represent a value indicating the detected color, for example, as detailed above, indicating a proportion of color information to describe the yellowness of the street marking.

For example, the color score can be determined by calculating proportions or other dependencies, based on a comparison of the different pieces of color information provided by the set of pixels, for example by using a training-based classifier, such as for example a neural network or a Fuzzy logic based classifier. In an example, the classifier can be trained by using a machine learning based training data set, for example with labeled white and yellow lane markings, such as to train the classifier to calculate a color score based on the different pieces of color information provided by the set of pixels.

Then, in step 240 shown in FIG. 2, the color score is compared to at least one threshold value to determine the color of the street marking.

For example, when using the red-clear camera, it is not possible to distinguish all visible spectrum colors. For example, it is not possible to distinguish the color yellow from pure red, or, e.g. magenta, which is a combination of red and blue.

However, as the street markings 130, 160 shown in FIG. 1 are either white or yellow, the red-channel information can be compared to the clear color information, for example to determine the proportion of the color information, and the resulting color score can used to distinguish between the two colors.

More specifically, such as to distinguish between the white and yellow colors of the street markings, the color score is compared to a threshold value.

In this way, the color score is determined based on a comparison of the different pieces of color information, and thus may compensate illumination affects that affect the different colors in the same or similar way. For example, changes in brightness and illumination that affect the different colors in the same or similar way can be compensated by comparing the different pieces of color information, for example by determining the proportion of color information.

Moreover, by gathering color scores determined for the street marking, the threshold value can be determined based on the statistical distribution of the gathered color scores. For example, the color scores can be gathered based on street markings detected in a plurality of images, for example in a plurality of image frames of a video stream captured by the camera 120.

In this way, the statistical distribution of the determined color score can be analyzed and estimated. For example, if in multiple frames, there is only one color (e.g. either white or yellow) of captured lane markings, the statistical distribution of the determined color score can be efficiently modelled for classification purposes, for example as a single Gaussian statistical distribution.

Figure 4:
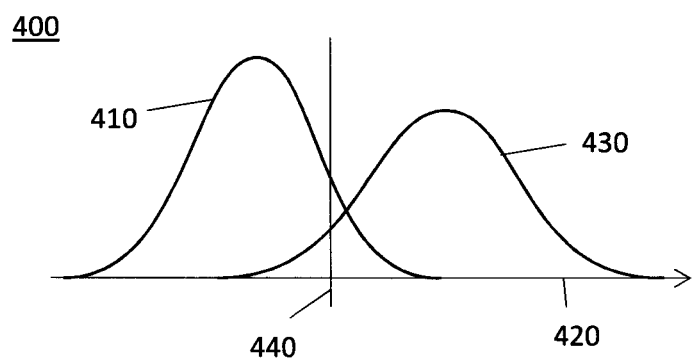
FIG. 4 is color score statistical distribution functions.

FIG. 4 shows color score statistical distribution functions 400 wherein a Gaussian statistical distribution for the color white 410 is defined as a Gaussian probability density function 420 of the color score. By repeating the analysis for a yellow lane marking that is captured in multiple frames of a video stream, the corresponding Gaussian statistical distribution for the color yellow 423 results. Thus, the two different colors correspond to the two different Gaussian statistical distribution functions 410, 420 shown in FIG. 4.

It follows that the relative difference between the two different colors can be described in statistical terms, and the corresponding threshold value 440 can be determined based on probability calculations derived from the different color score statistical distributions 410, 430.

In other words, the threshold value can be determined based on the statistical distribution of the color score being modelled as a superposition of a plurality of statistical color distributions, wherein each of the statistical color distributions corresponds to a color of a street marking.

Then, the color of the street marking is determined to correspond to a yellow color if the color score is greater than the threshold value, and the color of the street marking is determined to correspond to a white color if the color score is smaller than the threshold value, or vice-versa.

As mentioned above, if more than two colors need to be detected, the color score is compared to n threshold values such as to decide between n+1 different colors.

Accordingly, at least one threshold value is used to correctly distinguish between the different colors based on a comparison with a color score. Hence, the color score is derived by comparison of different pieces of color information, and thus can, in combination with the comparison with the at least one threshold value, enhance the robustness and efficiency of the color detection, in particular when changing image conditions affect the intensities of each of the pieces of color information in the same or similar manner.

Figure 5:
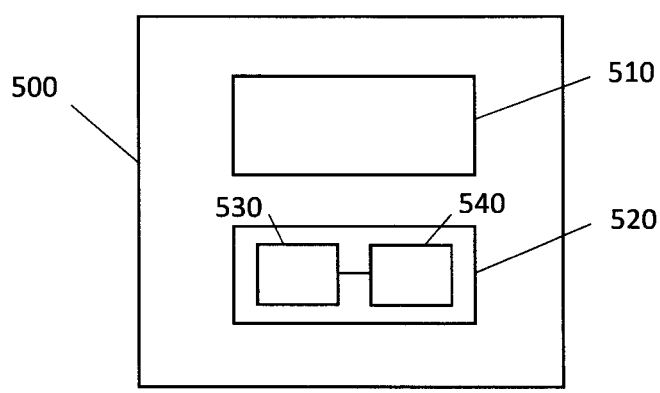
FIG. 5 is an image processing system.

FIG. 5 shows an image processing system 500 that is adapted to perform the method 200 shown in FIG. 2. For this purpose, the image processing system 500 comprises the camera 510, 120 for capturing the image of the street, and an image processing means 520 coupled to the camera 510. The image processing means is adapted to perform the above steps of: detecting a street marking as a set of pixels provided by the image, wherein the pixels include at least two different pieces of color information, determining a color score for the street marking by comparing said at least two different pieces of color information, and determining the color of the street marking by comparing the color score to at least one threshold value 440.

Here, the image processing means 520 includes computing means 530, such as for example a microprocessor, coupled to storage means 540, wherein the storage means 540 includes software adapted to be executed by the microprocessor, such as to perform the method steps shown in FIG. 2.

While this invention has been described in terms of the preferred embodiments thereof, it is not intended to be so limited, but rather only to the extent set forth in the claims that follow.

We claim:

1. A method for determining a color of a street marking, the method comprising:
   capturing an image of a street having one or more street markings;
   detecting one of the street markings as a set of pixels provided by the image,
      the one of the street markings limited, by traffic rules, to two color options, a first color option and a second color option,
      the set of pixels having two different pieces of color information, the first piece of color information indicating a single-color intensity and the second piece of color information indicating a combined-color intensity;
   determining a relationship between the first piece of color information and the second piece of color information for the set of pixels for the one of the street markings limited to the first and second color options; and
   determining, based on the determined relationship, that the one of the street markings limited to the first and second color options has a first color prescribed by the first color option or the second color prescribed by the second color option.

2. The method of claim 1, wherein the one of the street markings limited to the first and second color options is a lane line, the first and second color options are white and yellow, and the determining that the one of the street markings limited to the first and second color options determines that the lane line's color is white or yellow.

3. The method of claim 2, wherein the lane line is a center, dashed line in a center of the street.

4. The method of claim 2, wherein the lane line indicates a road exit, road crossing, or parking zone within the image of the street.

5. The method of claim 1, wherein the one of the street markings limited to the first and second color options indicates a construction zone, the first and second color options are white and yellow, and the determining that the one of the street markings limited to the first and second color options determines that the lane line's color is white or yellow.

6. The method of claim 1, wherein the first piece of color information indicating the single-color intensity measures red light information, and the second piece of color information indicating a combined-color intensity measures green or yellow, blue, and second red light information, the second piece of color information of the combined-color intensity not sufficient to distinguish the second red light information from green light information, blue light information, or yellow light information.

7. The method of claim 1, further comprising:
prior to capturing the image of the street having the one or more street markings, gathering, for street markings of a type matching the one of the street markings limited, by traffic rules, to the two color options, images of the street markings of the type; and
determining, based on the images of the street markings of the type, a threshold based on a ratio of the single-color intensity to the combined-color intensity or based on a ratio of the combined-color intensity to the single-color intensity, and
wherein the determining, based on the determined relationship, that the one of the street markings limited to the first and second color options has the first color prescribed by the first color option or the second color prescribed by the second color option is based on the determined threshold.

8. The method of claim 7, wherein the determining the threshold includes receiving an indication, from a user or different sensor than a device capturing the image of the street, the indication indicating the first color or the second color.

9. The method of claim 8, wherein the determining the threshold includes receiving the indication from the user, the user indicating training data for a machine-learning model, and wherein determining, based on the threshold, the first color prescribed by the first color option or the second color prescribed by the second color option uses the machine-learning model.

10. The method of claim 1, further comprising:
prior to capturing the image of the street having the one or more street markings, gathering, for street markings of a type matching the one of the street markings limited, by traffic rules, to the two color options, images of the street markings of the type; and
determining, based on the images of the street markings of the type, a threshold based on a statistical distribution modeled as a superposition of a plurality of statistical color distributions, each of the statistical color distributions corresponding to a color of a street marking, the statistical distribution modeled as a superposition of a plurality of Gaussian statistical color distributions, and
wherein the determining, based on the determined relationship, that the one of the street markings limited to the first and second color options has the first color prescribed by the first color option or the second color prescribed by the second color option is based on the determined threshold.

11. The method of claim 10, wherein the determining the threshold is further based on the color options prescribed by the traffic rules.

12. The method of claim 11, wherein the color options prescribed by the traffic rules and on which the determining the threshold is further based prescribe yellow and white.

13. The method of claim 1, wherein the single-color intensity is one of red, green, yellow, magenta, or blue, and the combining-color intensity is two or more of red, green, yellow, magenta, or blue.

14. The method of claim 1, wherein the single-color intensity and the combined-color intensity include insufficient color information to enable a third color option to be distinguished from the first and second color options limited by the traffic rules.

15. An image-processing system comprising:
a camera adapted to capture an image of a street having one or more street markings; and
an image processing means coupled to the camera, the image processing means configured to:
detect one of the street markings from a set of pixels of the image of the street, the one of the street markings limited, by traffic rules, to two color options, a first color option and a second color option, the set of pixels having two different pieces of color information, the first piece of color information indicating a single-color intensity and the second piece of color information indicating a combined-color intensity;
determine a relationship between the first piece of color information and the second piece of color information for the set of pixels of the one of the street markings limited to the first and second color options; and
determine, based on the determined relationship, that the one of the street markings limited to the first and second color options has a first color prescribed by the first color option or the second color prescribed by the second color option.

16. The image-processing system of claim 15, wherein the one of the street markings limited to the first and second color options is a lane line, the first and second color options are white and yellow, and the determination that the one of the street markings limited to the first and second color options has the first color or the second color determines that the lane line's color is white or yellow.

17. The image-processing system of claim 15, wherein the camera is configured to measure, as the first piece of color information indicating the single-color intensity, red light information, and to measure, as the second piece of color information indicating a combined-color intensity, green or yellow, blue, and second red light information, the second piece of color information including the second red light information but not sufficient to distinguish the second red light information from the green light information, the blue light information, or the yellow light information.

18. The image-processing system of claim 15, wherein the processing means is further configured to:
prior to capture of the image of the street having the one or more street markings, gather, for street markings of a type matching the one of the street markings limited, by traffic rules, to the two color options, images of the street markings of the type; and
determine, based on the images of the street markings of the type, a threshold based on a ratio of the single-color intensity to the combined-color intensity or based on a ratio of the combined-color intensity to the single-color intensity, and wherein the determination, based on the determined relationship, that the one of the street markings limited to the first and second color options has the first color prescribed by the first color option or the second color prescribed by the second color option is based on the determined threshold.

19. The image-processing system of claim 18, wherein the determination of the threshold includes receipt and use of an indication, from a user or different sensor than the camera, the indication indicating the first color or the second color.

20. The image-processing system of claim 19, wherein the determination of the threshold includes receipt of the indication from the user, the indication having training data for a machine-learning model, and wherein determination, based on the threshold, of the first color prescribed by the first color option or the second color prescribed by the second color option uses the machine-learning model.

* * * * *